United States Patent [19]

Casey

[11] Patent Number: 4,890,908

[45] Date of Patent: Jan. 2, 1990

[54] READILY ATTACHABLE AUXILIARY WIDE ANGLE OUTSIDE REARVIEW MIRROR

[76] Inventor: Everett R. Casey, 5845 Old Orchard Trail, Orchard Lake, Mich. 49033

[21] Appl. No.: 307,547

[22] Filed: Feb. 8, 1989

[51] Int. Cl.⁴ .............................................. A47G 1/17
[52] U.S. Cl. ................................... 350/606; 350/634; 248/467; 248/476
[58] Field of Search .............. 350/626, 627, 629, 625, 350/604, 606, 612, 617, 624, 632; 248/476, 477, 478, 479, 480; 468/467, 468, 495, 497

[56] References Cited

U.S. PATENT DOCUMENTS 4,793,701 12/1988 Brown ................................. 350/632

Primary Examiner—Bruce Y. Arnold

[57] ABSTRACT

An auxiliary, safety, wide-angle, convex mirror for ready and simple association with a vehicle-mounted outside rearview mirror which has a reflective glass mounted within the peripheral lip of an outer housing, the auxiliary mirror being secured in a position wholly outboard of the rearview mirror by a bracket having a surface adhesively secured to the face of the rearview-mirror glass.

13 Claims, 1 Drawing Sheet

U.S. Patent  Jan. 2, 1990  4,890,908
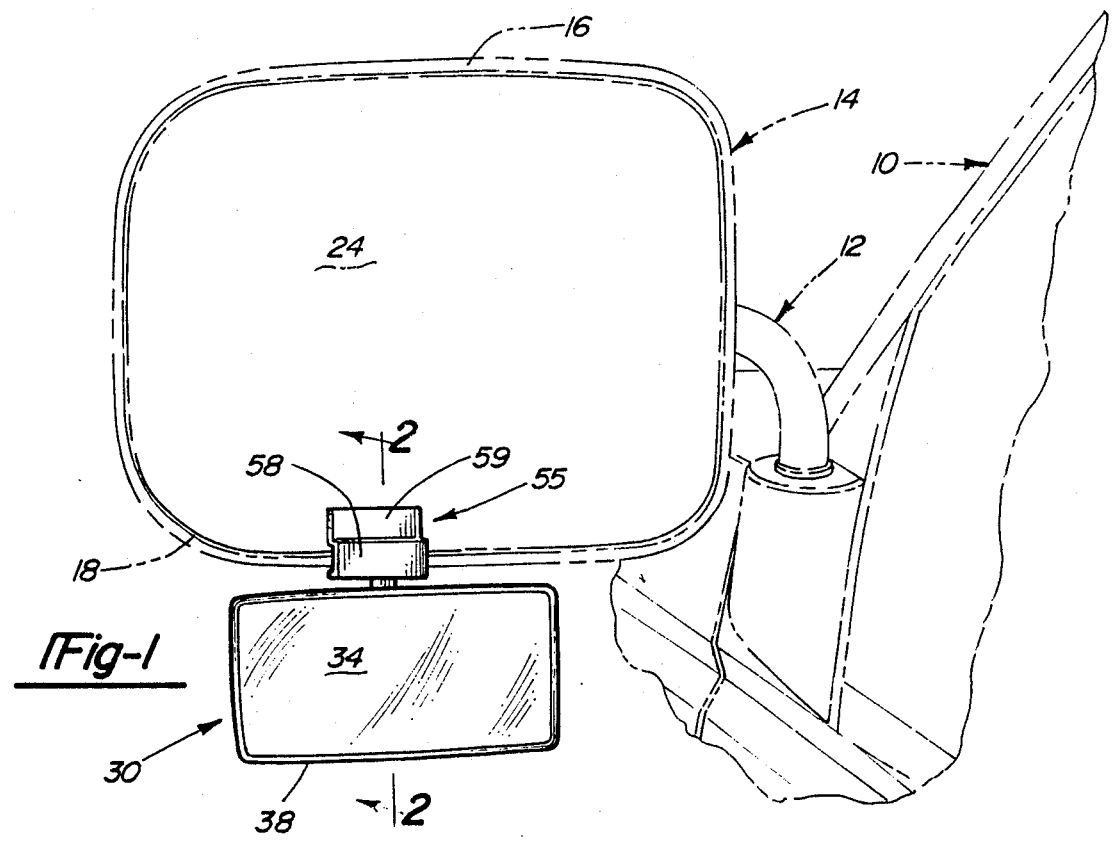
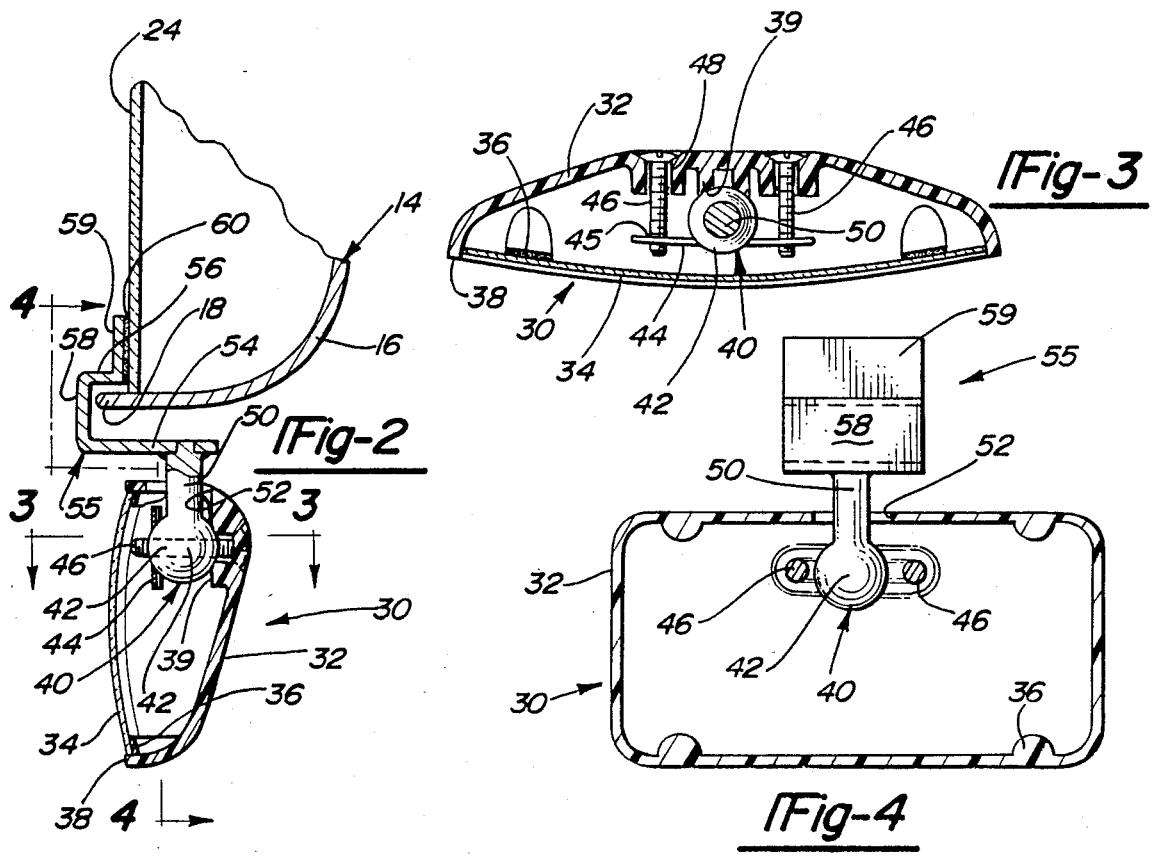

READILY ATTACHABLE AUXILIARY WIDE ANGLE OUTSIDE REARVIEW MIRROR

BACKGROUND OF THE INVENTION

This invention relates to vehicle mirrors and more particularly to auxiliary, convex, wide-angle, outside rearview mirrors for ready mounting on a vehicular rearview mirror without substantially blocking the vision therefrom.

It has long been recognized that rearview mirrors on cars and trucks provide, at best, but a limited field of view, that the "blind spot" areas not reflected in the mirrors are important to safety, and that some good remedy for that shortcoming of customary rearview mirrors should be found. The patent literature reflects much effort over the years directed towards the solution of the problem (see, e.g., U.S. Pat. Nos. 1,114,559, 2,582,651, 3,009,392, 3,146,296, 3,375,053, 3,588,233, 3,667,833, 4,345,819, 4,637,694, and Des. 231,520, as representative). See also my copending application, Ser. No. 07/207,522, filed 06/17/88. The principal prior commercial efforts to meet the need known to me, apart from the car-manufacturers' us of fairly large radius convex glass (often in the range of about 2 to 3 foot radius) in passenger-side mirrors, are the "bull's eye" convex mirrors designed to be glued directly to the face of the flat-glass mirror. These "bull's eye" glass mounted mirrors have met with some commercial success for application on the large-sized "West Coast" style truck mirrors where the area they obstruct is not a substantial percentage of the total area of the truck mirror, but for mirrors of the size currently provided on light trucks and vans, the convex mirrors for gluing onto the face of the flat glass must be unsatisfactorily small to avoid blocking an undue amount of the regular glass area, and have not proved to be a successful solution to the problem. I know of no prior art, adequate-sized, auxiliary, wide-angle outside rearview mirror which can be readily and simply nonobstructively mounted by the driver on the factory-supplied outside rearview mirror of current vehicles, and particularly light trucks and vans.

RELATED APPLICATIONS

My copending application, above identified, (the disclosure of which is incorporated herein by reference) provides a preferred solution to the problem where the auxiliary mirror is to be associated with a passenger-car type outside rearview mirror in which the mirror glass is pivotally adjustable within and relative to an outer shell or housing. The present application presents an alternative solution to that problem, but more particularly provides a preferred solution to the problem where the auxiliary mirror is to be associated with a mirror of the type in which the mirror glass is fixed relative to a housing which is itself pivotally mounted on the vehicle, as is typified by current truck and van mirrors.

SUMMARY AND OBJECTS OF THE INVENTION

The object of the present invention is to improve the safety of vehicles by providing an auxiliary wide-angle mirror for increasing the driver's effective field of view to the side and rear of the vehicle without significantly diminishing the effective area of the principal mirror, and which can be simply and readily installed by the driver.

DESCRIPTION OF THE DRAWINGS

FIG. 1 is an elevational view, from the rear of a vehicle, showing the auxiliary mirror constituting the preferred embodiment of the invention associated with the factory-mounted outside rearview mirror;

FIG. 2 is a cross-sectional view taken substantially along the line 2—2 of FIG. 1;

FIG. 3 is a cross-sectional view taken substantially along the line 3—3 of FIG. 2; and FIG. 4 is a cross-sectional view taken substantially along the line 4—4 of FIG. 2.

DETAILED DESCRIPTION OF THE ILLUSTRATED EMBODIMENT

Vehicles of recent manufacture are equipped with a factory-mounted outside rearview mirror on the driver's side and often with such a mirror on the passenger's side. Both such mirrors provide but limited fields of view, resulting in areas significant to safety not being displayed to the driver.

FIGS. 1 and 2 of the drawings illustrate a portion of the body 10 of a vehicle, representatively a current-model light truck or van, to which is mounted, by any known means 12, a factory-installed outside rearview mirror 14. Mirror 14 is intended to be typical of the great majority of light truck and van outside rearview mirrors in current production (the details of which are incorporated herein by reference). It has a concave outer shell or housing 16 which is closed toward the front of the vehicle, and has a rearward (of the vehicle) opening often defined by a peripheral lip 18.

A reflective glass 24 is supported within the housing 16. In the majority of current truck and van mirrors, the glass 24 is fixedly secured within the housing 16 in any suitable manner, with the entire housing being pivotally adjustably mounted on and relative to the vehicle 10 by the mounting means 12, it being recognized that there is much variation in the currently employed mounting and pivoting mechanisms. The principles of the present invention are preferably applied to mirrors of that type, in which the glass 24 is immovably secured within the shell or housing 16, with that entire enclosure or housing 16 being pivotally and adjustably mounted upon the vehicle. The principles of the present invention can be applied to the currently customary type of passenger-car outside rearview mirror, in which the glass (or case-enclosed glass) is itself pivotally mounted within the housing 16, but for that application, the solution which is the subject of my above-identified copending application is preferred in that it imposes no additional load on the more delicate pivoting mechanism often used in that type of mirror.

The auxiliary wide-angle or "blind-spot" (more accurately, "blind area" or "blind zone" mirror 30 is mounted outboard of the rearview mirror 14, that is, it is positioned laterally (below, above or to the side) of the mirror 14 and so positioned that it itself does not block the driver's view of any portion of the reflective glass 24. As will be seen, the mounting means for the mirror 30 may block a small percentage of the area of glass 24.

Mirror 30 includes a housing 32 (which may serve the functions of a shell or of a case, or both) shown to be concave with an opening directed toward the rear of the vehicle. Disposed within the opening of the hollow housing 32 is a convex mirror 34. In the illustrated best mode of practicing the invention, the mirror is glued (such as with room temperature vulcanizing RTV as commonly used by mirror manufacturers) to peripherally spaced shoulders 36 formed in the housing 32, as shown. The housing 32 may also have a peripheral lip 38 projecting rearwardly (of the vehicle) of the mirror 34.

Housing 32, which may for example be injection molded of a suitable plastic such as ABS (acrylonitrile butadiene styrene), is provided on its inner wall with a projection defining a ball socket 39 (FIGS. 2 and 3) having a concave generally spherical surface. The ball portion 42 of a ball stud 40 is disposed in engagement with socket 39 and is retained thereon by a socket plate 44 having a round aperture therein constituting a socket engaging the ball 42. Plate 44 has two tapped holes 45 spaced on opposite sides of that aperture for accepting screws 46 passing through holes 48 in the housing 32, with the heads of those screw engaging the housing 32 so as to exert forces clamping, with a force selected by the extent of the tightening of the screws 46, ball 42 between plate 44 and socket 39.

In the illustrated best mode of practicing the invention, the shank 50 of the ball stud 40 passes through an aperture 52 (which is large enough to permit the desired degree of pivotal movement) in the housing 32 and the end thereof is staked, welded or otherwise made integral with one leg 54 of a bracket 55. Bracket 55 further has an upstanding leg or bight portion 58 which joins a leg portion 56 which is shown to extend in generally parallelism with leg 54. Plate area 59 of bracket 55 projects upwards in general perpendicularity with leg 56 and serves as a mounting plate which is adhesively secured to the glass 24 of the principal mirror 14. In a preferred embodiment of the invention, the mounting plate 59 was about one inch long and ½ inch high, and a double sticky tape of about that same size was placed between plate 59 and glass 24. As an example, a double sticky foamed tape made by Adhesives Research, Inc. of Glen Rock, Pa., and designated PE2132 C04359E has been successfully employed, although other adhesives can also be utilized.

The size of plate 59 is selected to be large enough to provide an adequate bonding area while yet blocking but an insignificantly minimal portion of the viewing area of the main mirror glass 24. For example, even when the unit is associated with a representative passenger car mirror having a glass area of, say, 21 square inches, the area blocked by the mounting plate 59 is under 3%, and the portion of the area of a current light truck or van mirror is, of course, often less than half of that. Further, the dimensions of the bracket 55 are selected so that the mounting plate 59 lies at the bottom of the glass 24 so that the minor obstructed area is not a critical viewing area. Relevantly, the obstructing area of the plate 59 is but a small percentage of the area of the convex glass 34, such as, with a 2-inch by 4-inch convex glass size, under 7%, so that the area of obstructed view of the main mirror 24 by the bracket 59 is very small compared to the area of obstructed view of the main mirror if the entire convex glass 34 were to be glued directly on the face of the mirror 24.

The length of leg 56 and height of leg 58 are selected to provide adequate clearance for the lip 18 on the various commercial mirrors, which vary both in thickness and in the extent of their projection from the plane of the glass 24. In a preferred embodiment of the invention, the horizontal distance between the adhesive-coated face of plate 59 and the nearer face of leg 58 (that is, the depth of the pocket to accommodate the lip 18) is 0.260 inches, and the distance between the adjacent faces of legs 56 and 54 (that is, the height of the pocket to accommodate the lip 18) is 0.425 inches. The length of leg 54 was selected to establish approximate coplanarity between the main glass 24 and the auxiliary mirror 34, although that is not essential, and in the constructed embodiment the distance between the adhesive-coated face of plate 59 and the centerline of the stud 50 is 0.450 inches.

The auxiliary mirror 30 is associated with the main mirror 14 by simply pressing the adhesive-coated surface 60 against the pre-cleaned glass 24, with the mirror 30 being appropriately positioned. The housing 32 may then be pivoted to the optimum vertical and horizontal angles to provide the optimum blind-zone coverage for the driver. If desired, the screws 42 may then be further tightened to effectively lock the auxiliary mirror in that selected position, since with appropriated convex radii, one mirror position should serve all drivers, particularly since the mirror 24 is itself adjustable. Pivotal adjustability of the auxiliary mirror itself is not essential and the design can be modified to provide a rigid, nonadjustable connection between the bracket 55 and the housing 32, such as by screwing them together or insert molding an additional leg of bracket 55 into the housing 32, or otherwise rendering those parts integral. It is presently preferred that the mirror 34 have a radius of curvature in the range of 8 inches to 15 inches, although greater or lesser curvatures can be employed, with the constructed embodiment having a radius of about 12.5 inches.

It will be observed that the bracket or support means 55 supports the convex-glass mirror member 34 and the auxiliary mirror assembly 30 wholly laterally outboard of the rearview mirror 24 and adjacent or proximate the edge 18 thereof, and that the plate or securing surface 59 is adhesively bondable to the surface of the glass 24 proximate an edge thereof. Plate 59 is connected to mirror 34 by connecting means including, in the illustrated version, bracket 55. It is to be understood that by the expression wholly laterally outboard, I mean that the convex-glass mirror member 34 (as well as the housing 32) is not in a position to obstruct the driver's vision in the mirror 24.

While the disclosed embodiment represents the presently preferred embodiment of the invention and the best mode of practicing the invention, it is purely illustrative, and the invention includes those auxiliary mirrors which come within the spirit and scope of the appended claims and equivalents thereof.

What is claimed is:

1. An auxiliary, wide angle, convex-glass, blind-spot mirror for ready association with a vehicle-mounted outside rearview mirror having a reflective glass mounted within a mirror shell having a peripheral lip projecting rearwardly of the vehicle from the plane of the surface of the glass, comprising the combination of a wide-angle convex-glass mirror member, and support means for supporting said convex-glass mirror member wholly laterally outboard of the rearview mirror and proximate to the peripheral lip of the rearview mirror, comprising a securing surface disposable substantially parallel with and overlying a portion of the surface of the reflective glass proximate to an edge thereof and adhesively bondable thereto, and connecting means for connecting said securing means to said convex mirror member.

2. The combination of claim 1 in which the reflective glass is fixedly secured within the mirror shell and in which the mirror shell is pivotably adjustably secured to the vehicle.

3. The combination of claim 1 further including adhesive means adhesively bonded to said securing surface and adhesively bondable to the reflective glass.

4. The combination of claim 1 in which said securing surface is adhesively bonded to the reflective glass closely adjacent the peripheral lip of the rearview mirror.

5. The combination of claim 1 in which said securing surface has an area secured to the face of the reflective glass which is less than about 3% of the area of the refelective glass.

6. The combination of claim 1 in which said securing surface has an area secured to the face of the reflective glass which is less than about 7% of the area of the convex mirror member.

7. The combination of claim 1 in which said convex-glass mirror member has a radius of curvature between about 8 inches and about 15 inches.

8. The combination of claim 1 in which said connecting means includes a bracket having an offset portion providing clearance for the peripheral lip.

9. The combination of claim 1 in which said connecting means includes a first arm portion integral with said securing surface and extending generally perpendicularly thereto, a second arm portion integral with said first arm portion and extending generally perpendicularly thereto and in a direction opposite to said securing surface, and a third arm portion extending generally perpendicularly to said second arm portion to define a recess to accommodate the peripheral lip.

10. The combination of claim 1 in which said connecting means further includes a mirror housing for said convex-glass mirror member.

11. The combination of claim 10 in which said connecting means further includes a ball-and-socket pivotal connection.

12. An auxiliary, wide-angle, blind-spot mirror comprising a generally planar securing surface having an adhesive face, a housing portion closed on one side and having an opening on the opposite side, a convex-glass mirror member secured within the opening in said housing portion, and connecting means connecting said securing surface to said housing portion in a position in which said securing surface is spaced laterally from said housing portion and is in substantial parallelism with said convex-glass mirror member, said securing surface being small in area relative to the area of said convex-glass mirror member.

13. The combination of claim 12 in which said connecting means holds said securing means in substantial coplanarity with said convex-glass mirror member.

* * * * *